(12) United States Patent
Shih et al.

(10) Patent No.: US 9,208,172 B2
(45) Date of Patent: Dec. 8, 2015

(54) METHOD AND SYSTEM FOR VEHICLE IDENTIFICATION

(71) Applicant: YUAN-ZE UNIVERSITY, Zhongli, Taoyuan County (TW)

(72) Inventors: Huang-Chia Shih, Zhongli (TW); Hao-You Wang, Zhongli (TW)

(73) Assignee: YUAN-ZE UNIVERSITY, Zhongli, Taoyuan County (TW)

( * ) Notice: Subject to any disclaimer, the term of this patent is extended or adjusted under 35 U.S.C. 154(b) by 0 days.

(21) Appl. No.: 14/661,196

(22) Filed: Mar. 18, 2015

(65) Prior Publication Data

US 2015/0269190 A1  Sep. 24, 2015

(30) Foreign Application Priority Data

Mar. 18, 2014  (TW) .............................. 103110069 A

(51) Int. Cl.
*G06K 9/00* (2006.01)
*G06F 17/30* (2006.01)
*G06K 9/62* (2006.01)

(52) U.S. Cl.
CPC ........ *G06F 17/30247* (2013.01); *G06K 9/6215* (2013.01); *G06K 2209/23* (2013.01)

(58) Field of Classification Search
None
See application file for complete search history.

(56) References Cited

U.S. PATENT DOCUMENTS

2013/0156329 A1\*  6/2013  Szeliski et al. ................ 382/218

\* cited by examiner

*Primary Examiner* — Atiba O Fitzpatrick
(74) *Attorney, Agent, or Firm* — Ming Chow; Sinorica, LLC

(57) ABSTRACT

A vehicle identification system and method comprising (a) Calculating vehicle image and reference image of each vehicle by algorithm, in order to obtain respectively the first feature point set and second feature point set. (b) Comparing first feature point with second feature point to calibrate the vehicle image of each vehicle. (c) Establishing plurality of vehicle model image with a gradient bevel distance of the base of the conversion of such vehicles. (d) Capturing instant image of the vehicle. (e) Calculating instant image and reference image by algorithm to obtain respectively the third feature point and the second feature point. (f) Comparing the second feature point and the third feature point to calibrate the instant vehicle image. (g) The instant judgments greatest body image and the gradient of each pixel in each of the base vehicle model for each pixel of the image of the product to determine the real-time vehicle body image should compare of the vehicle model image of one of them.

10 Claims, 6 Drawing Sheets

METHOD AND SYSTEM FOR VEHICLE IDENTIFICATION

FIELD OF THE INVENTION

The present invention relates to a technical field of the vehicle identification, and more particularly to a kind of license plate that don't through identification of a non-coated by the deliberate elimination or variation, and available accurately identify the vehicle identity identification system and method of the identity of the vehicle.

BACKGROUND OF THE INVENTION

With the promotion of image identification technology, the vehicle identification system has been widely used in the fields of intelligent transportation, the fields of intelligent transportation contain of national expressway toll collection, vehicle theft and accident detection and other detection. The following taking national expressway toll collection as an example.

National freeway automatic tollbooths through the vehicle Identification system monitors the vehicle which is through automatic tollbooths to achieve the purpose of automatic vehicle monitoring fees.

In traditional, the vehicle identification system is capture images of the vehicle license plate or the characteristics information, and compare with the license plate information to identify the vehicle.

However, although the vehicle Identification system saves manpower, but it derivate another Problems, such as inappropriate driving, attempt to evade the vehicle identification system identification and other issues. By means of altered license plate, damage license plate, change the license plate or cover plates, etc.

In view of the aforesaid drawbacks of the prior art, the present invention provides the vehicle identification system and method to solve the lack of conventional techniques.

SUMMARY OF THE INVENTION

A first aspect of the invention is to provide the vehicle identification system still efficient and accurately identifies vehicle identity without through identifying vehicle license plates.

A second aspect of the invention is to provide the vehicle identification to identify vehicle by means of detecting vehicle body or car model.

In order to achieve the above and other objectives, the present invention provides the vehicle identification system for identifying a plurality of vehicles. The system includes a vehicle database, a model database, an image capture unit and a process unit. The vehicle database stores a plurality of vehicle body images. The model database is connecting to the vehicle database. The model database obtains vehicle body image from the vehicle database, calculating vehicle image and reference image of each vehicle by algorithm, in order to obtain respectively the first feature point and second feature point. Comparing the first feature point and the second feature point to calibrate the instant vehicle image and establishing the plurality of vehicle model image of chamfer distance transform with a gradient bevel distance. The process unit is connected to the model database and the image capture unit.

In order to achieve the above purpose, the invention provides a vehicle identification method to identify a plurality of vehicles, the vehicle identification method includes the following steps: (a) Calculating vehicle image and reference image of each vehicle by algorithm, in order to obtain respectively a first feature point set and a second feature point set. (b) Comparing the first feature point with the second feature point to calibrate the vehicle image of each vehicle. (c) Establishing the plurality of vehicle model images with a gradient bevel distance of the base of the conversion of such vehicles. (d) Capturing instant image of the vehicle. (e) Calculating instant image and reference image by algorithm to obtain respectively a third feature point and the second feature point. (f) Comparing the second feature point and the third feature point to calibrate the instant vehicle image. (g) The instant judgments greatest body image and the gradient of each pixel in each of the base vehicle model for each pixel of the image of the product to determine the real-time vehicle body image should compare of the vehicle model image of one of them.

Comparing with the prior art, the invention provides the vehicle identification system and method, it is mainly by means of speeded up robust feature (SURF) calculation algorithm of the feature point of a vehicle image and through the feature point calibrate the vehicle image. In the meantime, establishing the vehicle model image by a chamfer distance transform. Without direct identify the vehicle license plates it can still identify the vehicle identity by means of judging the vehicle of calibrated gradient feature of image, such as models texture or exclusive marked, objects and defects.

Calibrated vehicle image through chamfer distance transform to build the image of vehicle models and calculates the similarity with the vehicle model image between the immediate images to produce a comparison result. In addition, the vehicle model image unifies all the significant feature of a plurality of vehicle image to an image, a making model database integrated and construct a complete vehicle body and unique.

BRIEF DESCRIPTION OF THE DRAWINGS

Objectives, features, and advantages of the present invention are hereunder illustrated with specific embodiments in conjunction with the accompanying drawings, in which.

DETAILED DESCRIPTION OF THE PREFERRED EMBODIMENTS

As indicated above, the invention provides a scenario-based security method and system. The following comprises preferred embodiments of the invention, which describe different aspects of the present invention.

Figure 1:
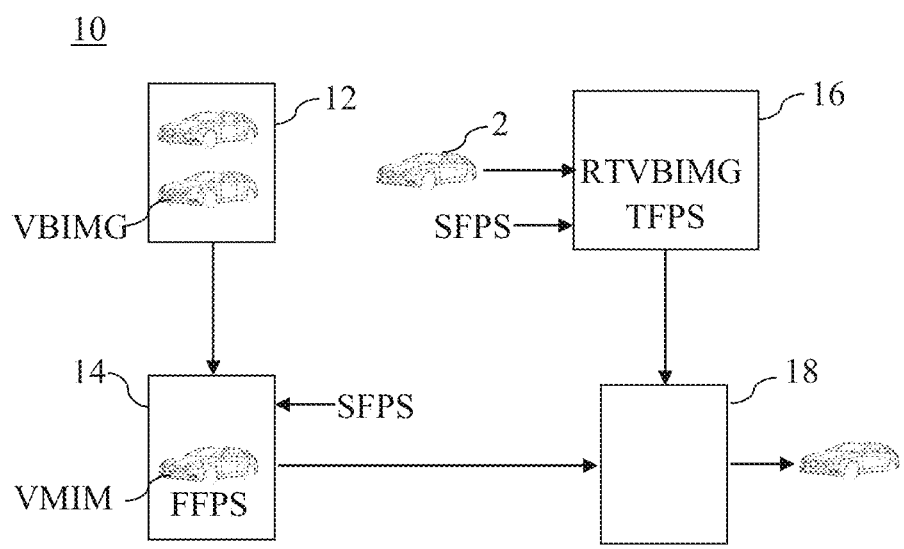
FIG. 1 is a schematic diagram of vehicle identification system according to an embodiment of the present invention.

Referring to FIG. 1, is a schematic diagram of vehicle identification system according to an embodiment of the present invention. In FIG. 1, the vehicle identification system 10 is identifies a plurality of vehicle body 2. In this embodiment, the vehicle identification system 10 is taking automated tollbooth on free way as an example, in another embodiment, it also can applies to vehicle theft detection, car accident detection or parking.

The vehicle identification system 10 includes a vehicle database 12, a model database, an image capture unit 16 and a process unit 18.

The vehicle database 12 pre-stored a plurality of vehicle body image VBIMG of the vehicle 2. Actually, the vehicle database 12 can through such as supervisors or ETC branches to capture the vehicle body image VBIMG.

The model database 14 is connected to the model database 12. The model database 14 obtains the vehicle body image VBIMG from the vehicle database 12, and the model database 14 is according to the vehicle body image VBIMG establishing the vehicle 2 to a plurality of vehicle model image VMIMG correspondence.

The vehicle model image VMIMG can through at least one or more algorithms to calculate the vehicle body image VBIMG and acquired such a vehicle model corresponding vehicle model image VMIMG.

In this embodiment, the model database 14 calculates the vehicle body image VBIMG of the vehicle 2 by algorithm to acquire the first feature point set FFPS and calculate the reference image BI to acquire the second feature point set SFPS. For example, the algorithm is a Speeded Up Robust Feature (SURF), a Scale-invariant feature transform (SIFT), a fast retina key point (FREAK), a Binary robust invariant scalable keypoints (BRISK), a binary robust independent elementary features (BRIEF), an oriented fast and rotated BRIEF (ORB), a Histogram of oriented gradient (HOG). Significantly, the above mentioned algorithm, in addition, it's includes another algorithm that is not be mentioned. As long as another algorithm can achieve the above effects, it accord with the stipulated in this embodiment. In order to explain, the following is taking speeded up robust feature as an example illustrates.

The model database 14 is compare with the first feature point set FFPS and the second feature point set SFPS, making the basic image BI calibrate the vehicle basic image of each vehicle 2, and establish the vehicle model image VBIMG which is includes the chamfer distance transform.

The image capture unit 16 capture the real-time VBIMG of vehicle 2. The image capture unit 16 by the SURF to obtain the third feature point set TFPS and calculate the basic image BI by SURF algorithm to obtain the second feature point set SFPS.

The image capture unit 16 compares with the second feature point set SFPS and the third feature point set TFPS, making the basic image BI calibrates the real-time vehicle body image RTVBIMG.

The process unit 18 connect the model database 14 and the image capture unit 16.

The process unit 18 calculate the real-time vehicle body RTVBIMG. The instant judgments greatest body image and the gradient of each pixel in each of the base vehicle model for each pixel of the image of the product to determine the real-time vehicle body image RTVBIMG should compare of the vehicle model image of one of them.

The calculation processing unit 18 in the immediate product of the body image RTVBIMG gradient substrate with each model for each pixel image such vehicles VMIMG gradient between the base of each pixel, as well as those from the largest selection of the product's value in the plurality of to determine the immediate body image RTVBIMG should compare with the vehicle model image VMIMG of one person. In other words, with a maximum value of the product and can confirm that the immediate body image that is the current model RTVBIMG image of the vehicle VMIMG 2 corresponding to the vehicle.

Figure 2:
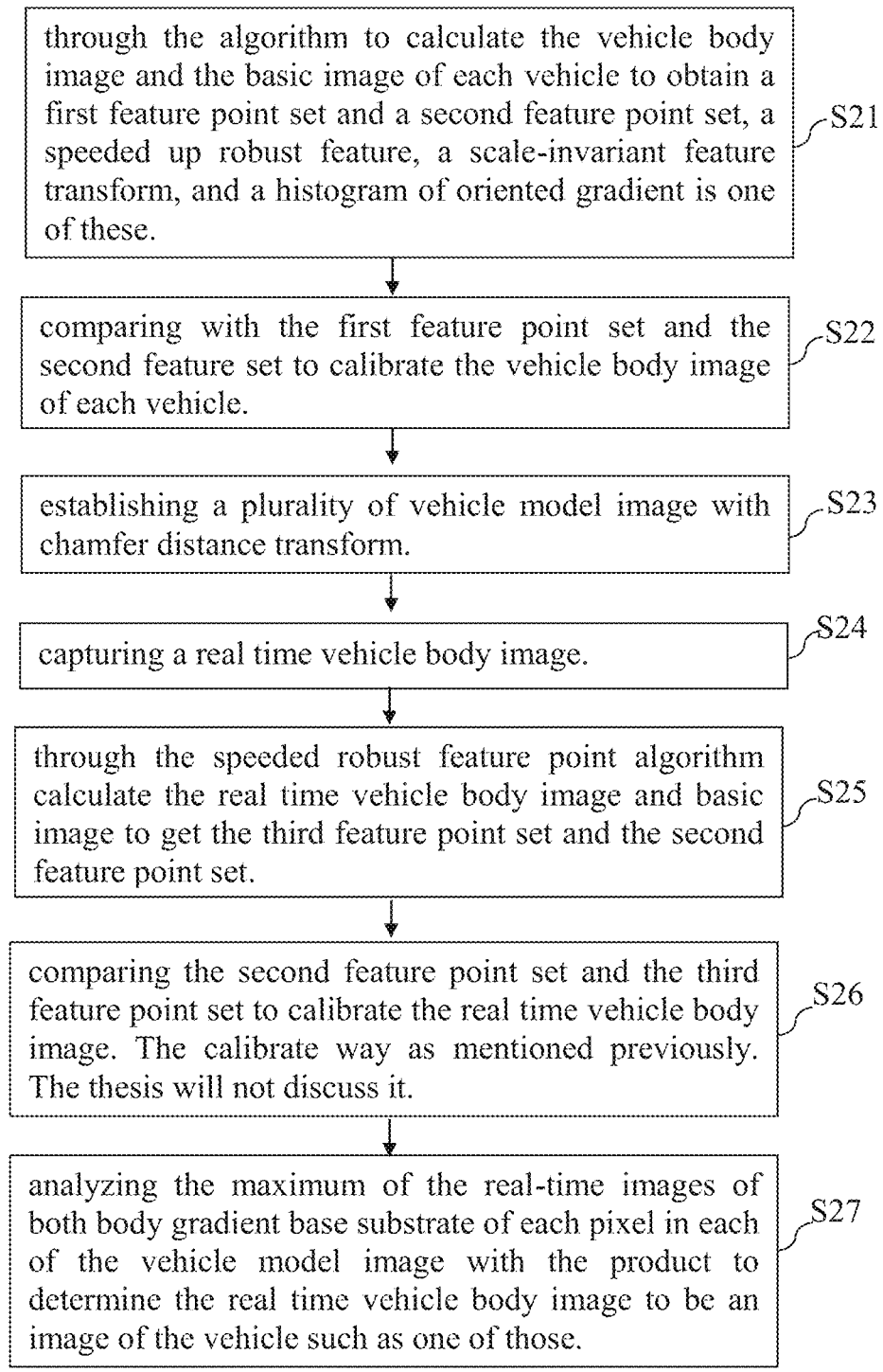
FIG. 2 is a schematic diagram of the step of vehicle identify method according to an embodiment of the present invention.

Referring to FIG. 2, it is the procedure diagram of the vehicle identification method according to an embodiment of the present invention. In the FIG. 2, the vehicle identification identify the plurality of vehicle body, and the first step is start at S21, through the algorithm to calculate the vehicle body image and the basic image of each vehicle to obtain a first feature point set and a second feature point set, a SURF, a scale-invariant feature transform, and a histogram of oriented gradient is one of these.

In S22, comparing with the first feature point set and the second feature point set to calibrate the vehicle body image of each vehicle.

In S23, establishing a plurality of vehicle model image with chamfer distance transform.

S21 to S23 are as be described as below:

Due to a different horizontal displacement, a vertical displacement and a rotation angle, and not assure includes the whole vehicle body, therefore, it is necessary to calibrate the vehicle body image. In this embodiment, using algorithm to calibrate the vehicle body image.

In this embodiment, the algorithm is a taking SURF as an example, it's improvement of the scale-invariant feature transform. The SURF detect and describe the interested point by gradient information. The SURF is widely using Harris corner detector, but there are some deletion in the traditional Harris corner detector, it cannot detect the image that is being scale transform. In addition, part of the description of the feature points, the SURF points maintain the original calculation of the scale invariant feature gradient algorithm to find the response points. The advantage is that the image can resist rotation or scaling such as factor variation, making the SURF search the right corresponding point.

The compare procedure of SURF point algorithm is distributed into few steps.

1) Through feature point construct a Hessian matrix

Figure 3:
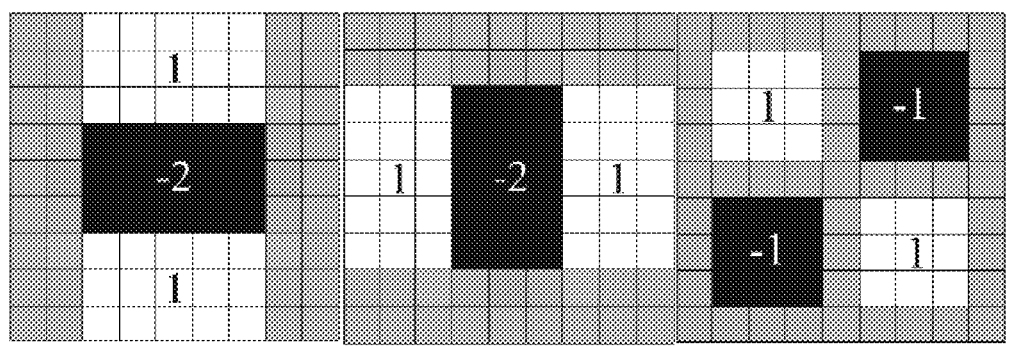
FIG. 3 is a box filter according to an embodiment of the present invention.

The main part of the SURF point is a Hessian matrix, and each image of an arbitrary pixel can be calculated corresponding to the pixels of the Hessian matrix. In another embodiment, Gaussian filter can be replaced by the box filter, such as the 9×9 box filter which is presented by Herbert Bay, as shown in FIG. 3 is a 9×9 box filter.

2) The Scale-space representation

Figure 4:
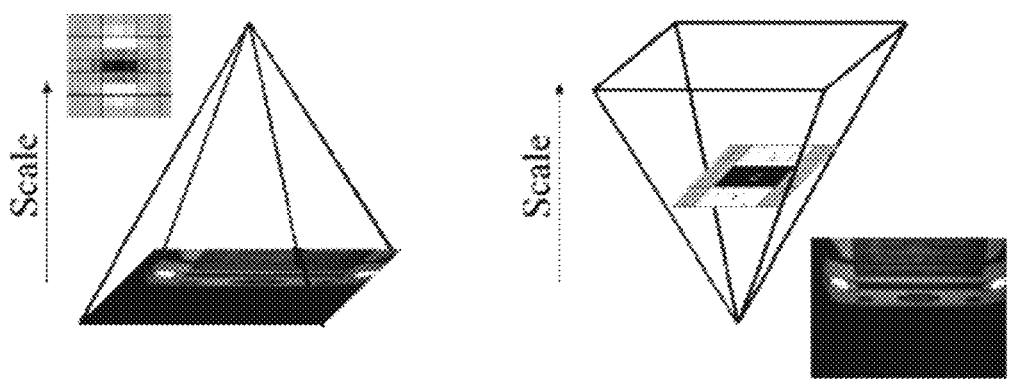
FIG. 4 is a schematic diagram scale space according to an embodiment of the present invention.

The Scale-space representation is the image resolution, the best situation is among any image resolution, the feature point of image could be find out. Generally, the scale space is usually interpreted as a pyramid model, as shown in FIG. 4, a schematic diagram of the scale space. Using the SURF points make the image when performing scaling does not change the size of the image, but to adjust the size of a Gaussian blur. In this way, the SURF point could be promoted.

3) Features location

The SURF point algorithm adopt the way of calculate that doesn't change the scale, Searching the strong feature point in any scale through 3D.

4) Select the main direction of the feature points

Figure 5:
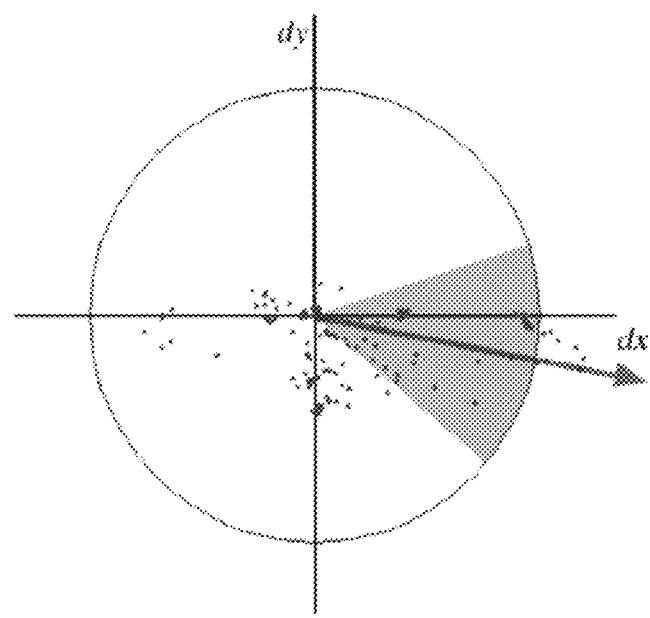
FIG. 5 is a schematic diagram of determine the main direction of the feature points according to an embodiment of the present invention.

In order to make the SURF point algorithm no allowance for rotation, it's necessary to get the main direction of each feature point. The non-change feature algorithm calculates the main direction of feature point by statistics gradient histogram. And the SURF point algorithm through calculate the area of single feature point Harr wavelet. Retrieving the range of a circle around the feature point and then calculate all the sum value of Haar wavelet in the range of a fan, the range of the fan angle is 10 degree to 170 degree. In this embodiment, the angle of the fan is taking 60 degree as an example illustrates, refer to FIG. 5. In FIG. 5, through the nonstop rotated fan in the circle to search the fan which is includes the maximum of feature point to confirm the main direction of feature point.

5) Constructing SURF point describes.

Figure 6:
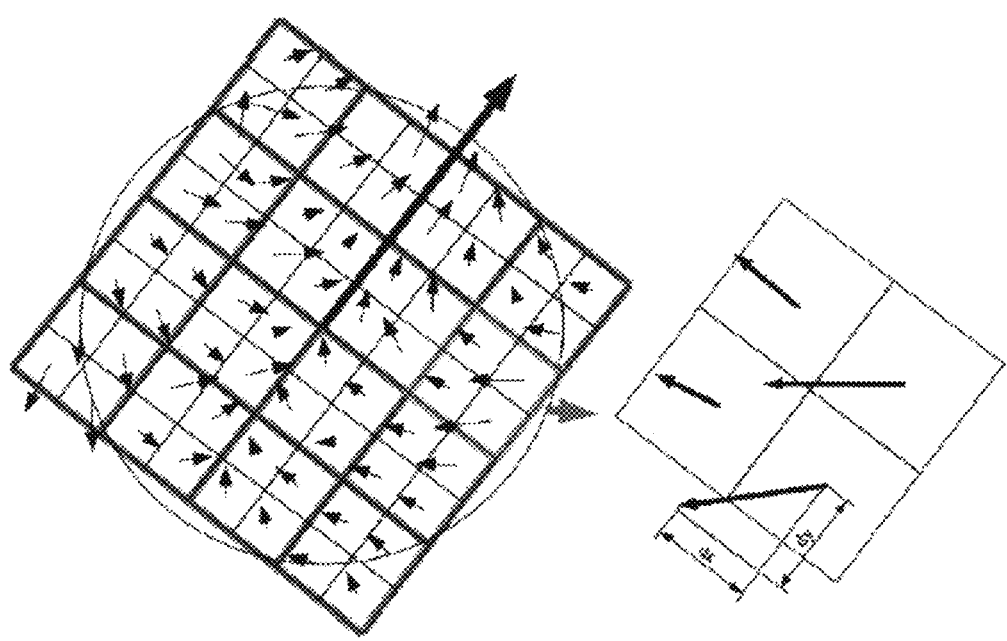
FIG. 6 is the illustrated feature point of speeded up robust feature calculate according to an embodiment of the present invention.

The SURF construct a square around the first feature point and calculate the Haar wavelet vertical sum, the absolute value of the sum of the vertical, horizontal sum and the absolute value of the sum of the horizontal. Referring to FIG. 6 is SURF point.

Through the above 1 to 5, calibrating image.

At first, using the basic image as the basic of calibrated image. Through the SURF point calculate basic image and the feature point of the vehicle body image. And then compare between these, finally get a point-pairs.

In another embodiment, if the vehicle body image has lower contrast, the SURF point finds the wrong point-pairs in the initial stage. In order to remove these wrong point-pairs, in this embodiment, sorts of the reliability point-pairs. By removing a space gap between the two points of the first two feature points and the point-pairs of the second focus of the feature set of points is greater than or less than a point-pairs of a predetermined distance.

The SURF point find the screening point-pairs, these point-pairs can calculate body rotation angle, by calculating the reference image and the corresponding points between two images of the body vector angle difference, and through affine transformation to get rotation matrix. Next, calculate the ratio of the reference image and the two corresponding points of the difference between body image and then through affine transformation get a shift matrix.

S24, capturing a real-time vehicle body image.

S25, through the SURF point algorithm calculate the real-time vehicle body image and basic image to get the third feature point set and the second feature point set.

S26, comparing the second feature point set and the third feature point set to calibrate the real-time vehicle body image. The calibrate way as mentioned previously. The thesis will not discuss it.

S27, analyzing the maximum of the real-time images of both body gradient base substrate of each pixel in each of the vehicle model image with the product to determine the real-time vehicle body image to be an image of the vehicle such as one of those.

In another embodiment, due to the information of single chamfer vehicle model might not be complete. Therefore, by means of superimposing a large number of vehicle model as the final model. In other words, through the chamfer vehicle model constantly superimposed in order to leave a unique synergy of high information while suppressing the low part of the unique synergy, ultimately the chamfer vehicle model has a complete vehicle body information.

The present invention is disclosed above by preferred embodiments. However, persons skilled in the art should understand that the preferred embodiments are illustrative of the present invention only, but should not be interpreted as restrictive of the scope of the present invention. Hence, all equivalent modifications and replacements made to the aforesaid embodiments should fall within the scope of the present invention. Accordingly, the legal protection for the present invention should be defined by the appended claims.

What is claimed is:

1. A vehicle identification system provides to identifying a plurality of vehicle body of vehicles to confirm an identity of the plurality of vehicles, the vehicle identification system includes:

a vehicle database, storing a plurality of vehicle body image of vehicles;

a model database, connecting to the vehicle database, the model database retrieving the vehicle body image from the vehicle database and through an algorithm to calculate the vehicle body image and a reference image to get a first feature point set and a second feature point set, and compare with the first feature point set and the second feature point set, the reference image calibrating each vehicle body image, and establishing a plurality of vehicle model images with a chamfer distance transform;

an image capture unit, capturing a real-time vehicle body image of each vehicle, the image capture unit through the algorithm calculates the real-time vehicle body image and the reference image to get the third feature point set and the second feature point set, the reference image calibrating the real-time vehicle body image; and a process unit, connecting to the model database and the image capture unit, the process unit calculating the real-time base body image gradient for each pixel in each image with the plurality of vehicle models in a plurality of product between the gradient of each pixel of the substrate, and selecting a maximum value within the plurality of product to determine the real-time vehicle body image corresponding to one of the vehicle model images.

2. A vehicle identification method provides to identifying a plurality of vehicles, the vehicle identification method includes steps:

calculating a vehicle image of each vehicles and a reference image by an algorithm for retrieving a first feature point set and a second feature point set;

comparing the first feature point set with the second feature point set for calibrating the vehicle image of each vehicles, establishing a plurality of vehicle model images of the plurality of vehicles with a chamfer distance transform of a gradient base;

capturing a real-time vehicle body image of one of the plurality of vehicles;

calculating the vehicle image and a reference image by an algorithm for retrieving a third feature point set and the second feature point set;

comparing with the second feature point set and the third feature point set for calibrate the vehicle image of each vehicles, and analyzing a maximum value of a body gradient base of each pixel of the real-time images to product the vehicle model images to determine the real-time vehicle body image to corresponding to one of the vehicle model images.

3. A vehicle identification method of claim 2, wherein the algorithm utilizes the first feature point set to establish Hessian matrix, wherein before Hessian matrix is established, a Gaussian filtering algorithm calculates the first feature point set and adjusts a size of a Gaussian blur to change a resolution of the vehicle body image.

4. A vehicle identification method of claim 3, wherein the algorithm is used to detect and describe the first feature point set of vehicle body image in three-dimension.

5. A vehicle identification method of claim 3, wherein the algorithm calculates a Haar wavelet closer to the first feature point set and sets a range of a circle around the first feature point set and calculates a maximum sum value of Haar wavelet in a range of a fan of the circle.

6. A vehicle identification method of claim 5, wherein the algorithm constructs a square around the first feature point set and calculates a sum of a vertical direction of Haar wavelet, a sum of an absolute value of the vertical direction of Haar wavelet, a sum of a horizontal direction of Haar wavelet, and a sum of an absolute value of the horizontal direction of Haar wavelet.

7. A vehicle identification method of claim 2, wherein among the step of compare the first feature point set and the second feature point set, removing a space gap is greater than or less than a point-pairs of a predetermined distance, wherein the space gap is between the two points in the first feature point set and the two points in the second feature point set, the two points in the first feature point set is corresponding to the two points in the second feature point set.

8. A vehicle identification method of claim 7, further includes calculating an angle difference between the reference image and the vehicle body image, and obtaining a rotation matrix through an affine transformation, and the rotation matrix rotates the vehicle body image.

9. A vehicle identification method of claim 8, further includes calculating a ratio difference of the reference image and the vehicle body image, and after adjusting the vehicle body image by the angle difference and ratio difference for acquiring an affine transformation matrix.

10. A vehicle identification method of claim 2, wherein the algorithm is at least one of a speeded up robust feature (SURF), a scale-invariant feature transform (SIFT), a fast retina key point (FREAK), a Binary robust invariant scalable keypoints (BRISK), a binary robust independent elementary features (BRIEF), an oriented fast and rotated BRIEF (ORB), and a histogram of oriented gradient (HOG).

\* \* \* \* \*